United States Patent
Bhandarkar

(10) Patent No.: US 9,577,943 B1
(45) Date of Patent: Feb. 21, 2017

(54) TIERED SERVICES IN BORDER GATEWAY PROTOCOL FLOW SPECIFICATION

(71) Applicant: Juniper Networks, Inc., Sunnyvale, CA (US)

(72) Inventor: Pravin Bhandarkar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 73 days.

(21) Appl. No.: 14/656,219

(22) Filed: Mar. 12, 2015

(51) Int. Cl.
  *H04L 12/28* (2006.01)
  *H04L 12/851* (2013.01)
  *H04L 29/06* (2006.01)

(52) U.S. Cl.
  CPC ....... *H04L 47/2433* (2013.01); *H04L 65/1036* (2013.01)

(58) Field of Classification Search
  CPC ............ H04L 47/2433; H04L 65/1036; H04L 12/851; H04L 29/062
  See application file for complete search history.

(56) References Cited

U.S. PATENT DOCUMENTS

| | | | |
|---|---|---|---|
| 7,990,893 B1* | 8/2011 | Singh ............... | H04L 45/04 370/254 |
| 2011/0205931 A1* | 8/2011 | Zhou ................ | H04L 43/026 370/253 |
| 2013/0044758 A1* | 2/2013 | Nguyen ............. | H04L 45/306 370/401 |
| 2014/0079062 A1* | 3/2014 | Edsall .............. | H04L 45/38 370/392 |
| 2014/0269713 A1* | 9/2014 | Huang .............. | H04L 45/308 370/392 |
| 2015/0271132 A1* | 9/2015 | Erb ................. | H04L 61/1511 709/223 |
| 2016/0182561 A1* | 6/2016 | Reynolds, II ...... | H04L 41/0686 726/1 |

OTHER PUBLICATIONS

Juniper Networks, "Fast Update Filters Overview", Mar. 8, 2012, http://www.juniper.net/techpubs/en_US/junos12.1/topics/concept/subscriber-management-dynamic-firewall-fast-update-filters-overview.html, 3 pages.
Juniper Networks, "Classic Filters Overview", Mar. 8, 2012, http://www.juniper.net/techpubs/en_US/junos12.1/topics/concept/subscriber-management-dynamic-firewall-classic-filters-overview.html, 2 pages.
Wikipedia, "Border Gateway Protocol", Mar. 11, 2015, 16 pages.
(Continued)

*Primary Examiner* — Robert Wilson
(74) *Attorney, Agent, or Firm* — Harrity & Harrity, LLP

(57) ABSTRACT

A device may receive information, via one or more border gateway protocol messages, identifying a first network traffic service and a second network traffic service. The device may map the information identifying the first network traffic service and the second network traffic service to information identifying a first tier of service for the first network traffic service and a second tier of service for the second network traffic service. The device may perform a first action and a second action, respectively associated with the first network traffic service and the second network traffic service, on the incoming network traffic, based on an order of the first tier of service, for the first network traffic service, and the second tier of service, for the second network traffic service, in a priority ordering of the set of network traffic services.

20 Claims, 8 Drawing Sheets

(56) References Cited

OTHER PUBLICATIONS

Wikipedia, "Route Reflector", Feb. 27, 2015, 2 pages.
Steven Fouant, "BGP Flow Spec—Using BGP to Disseminate Flow Specification Rules for Traffic Filtering Applications", Nov. 15, 2009, 5 pages.
P. Marques et al., "Dissemination of Flow Specification Rules", Network Working Group, RFC-5575, Aug. 2009, 22 pages.

* cited by examiner

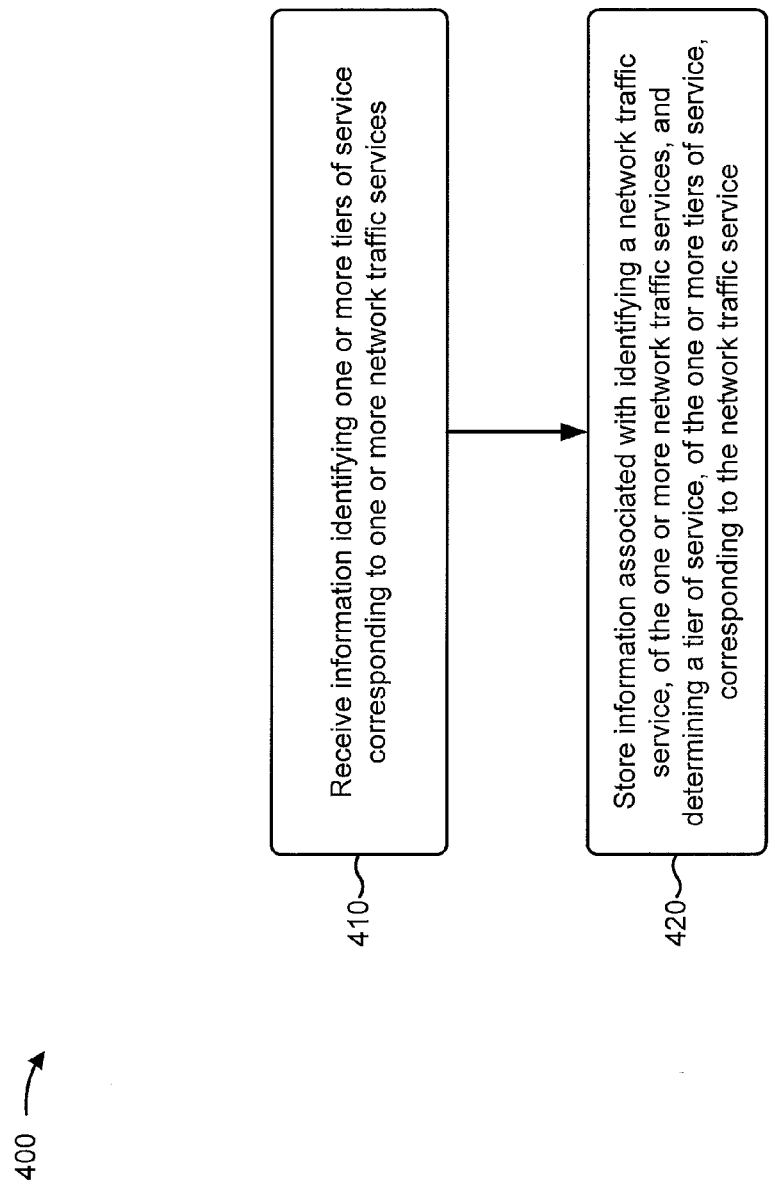

US 9,577,943 B1

TIERED SERVICES IN BORDER GATEWAY PROTOCOL FLOW SPECIFICATION

BACKGROUND

Border gateway protocol (BGP) may be utilized to exchange information associated with routing and reachability between network devices in a network, such as a set of edge devices. BGP may be utilized by the set of edge devices in a full mesh configuration. However, increasing the quantity of edge devices in a particular network may significantly increase network connections utilized for a full mesh configuration. Thus, a route reflector may be utilized to replace a full mesh configuration while still permitting BGP.

SUMMARY

According to some possible implementations, a device may receive information, via one or more border gateway protocol messages, identifying a first network traffic service and a second network traffic service. The first network traffic service may be associated with a first action performed by the device on incoming network traffic. The second network traffic service may be associated with a second action performed by the device on the incoming network traffic. The device may map the information identifying the first network traffic service and the second network traffic service to information identifying a first tier of service for the first network traffic service and a second tier of service for the second network traffic service. The first tier of service and the second tier of service may indicate a priority ordering of a set of network traffic services. The set of network traffic services may include the first network traffic service and the second network traffic service. The device may perform the first action and the second action, on the incoming network traffic, based on an order of the first tier of service, for the first network traffic service, and the second tier of service, for the second network traffic service, in the priority ordering of the set of network traffic services.

According to some possible implementations, a method may include receiving, by a first device, network traffic from a second device. The network traffic may be tagged with a border gateway protocol message. The method may further include identifying, by the first device, a network traffic service to be performed on the network traffic based on the border gateway protocol message. The network traffic service may be associated with an action. The method may further include determining, by the first device, a tier of service associated with the network traffic service based on a stored services policy. The method may further include executing, by the first device, the action on the network traffic based on the first tier of service. The action may be associated with the network traffic service.

According to some possible implementations, a computer-readable medium may store instructions that, when executed by one or more processors of a device, cause the one or more processors to receive one or more border gateway protocol extended community attributes. The one or more processors are further to identify a first network traffic service and a second network traffic service based on the one or more border gateway protocol extended community attributes. The first network traffic service may be associated with a first action performed by the device on incoming network traffic. The second network traffic service may be associated with a second action performed by the device on the incoming network traffic. The one or more processors are further to map the one or more border gateway protocol extended community attributes to a first tier of service associated with the first network traffic service and a second tier of service associated with the second network traffic service. The first tier of service and the second tier of service may be associated with a priority ordering of network traffic services. The one or more processors are further to selectively perform the first action and the second action, on the incoming network traffic, based on a priority order of the first tier of service, for the first network traffic service, and the second tier of service, for the second network traffic service, in the priority ordering of the network traffic services.

BRIEF DESCRIPTION OF THE DRAWINGS

FIGS. 4A and 4B are flow charts of an example process for utilizing tiered services with BGP.

DETAILED DESCRIPTION

The following detailed description of example implementations refers to the accompanying drawings. The same reference numbers in different drawings may identify the same or similar elements.

Border gateway protocol (BGP) may be utilized by a network to facilitate an exchange of routing and/or reachability information between network devices of the network, such as edge devices, gateway devices, servers, or the like. A route reflector may be utilized to facilitate connections to the network devices of the network, thereby reducing the quantity of network connections as compared with a full mesh network configuration. The Internet Engineering Task Force (IETF) Request For Comments (RFC) 5575 includes information regarding dissemination of flow specification rules via BGP. Flow specification rules may be encoded as a BGP network layer reachability information (NLRI) message. Some traffic filtering flow specification rules (i.e., network traffic services) have been allocated, such as a "flow spec traffic-rate," a "flow spec traffic-action," a "flow spec redirect," a "flow spec traffic-remarking," or the like. The flow specification rules may be identified by an extended community attribute. A route reflector may tag a particular network traffic flow as a malicious flow via an extended community attribute identifying a particular network traffic service to be executed. However, when multiple network traffic services are identified, an edge device may assign a quantity of computing resources to a less desirable network traffic service. Implementations, described herein, may utilize tier identifiers to ensure provisioning of computing resources toward higher priority network traffic services over lower priority network traffic services. In this way, network performance may be improved.

Figures 1A, 1B:
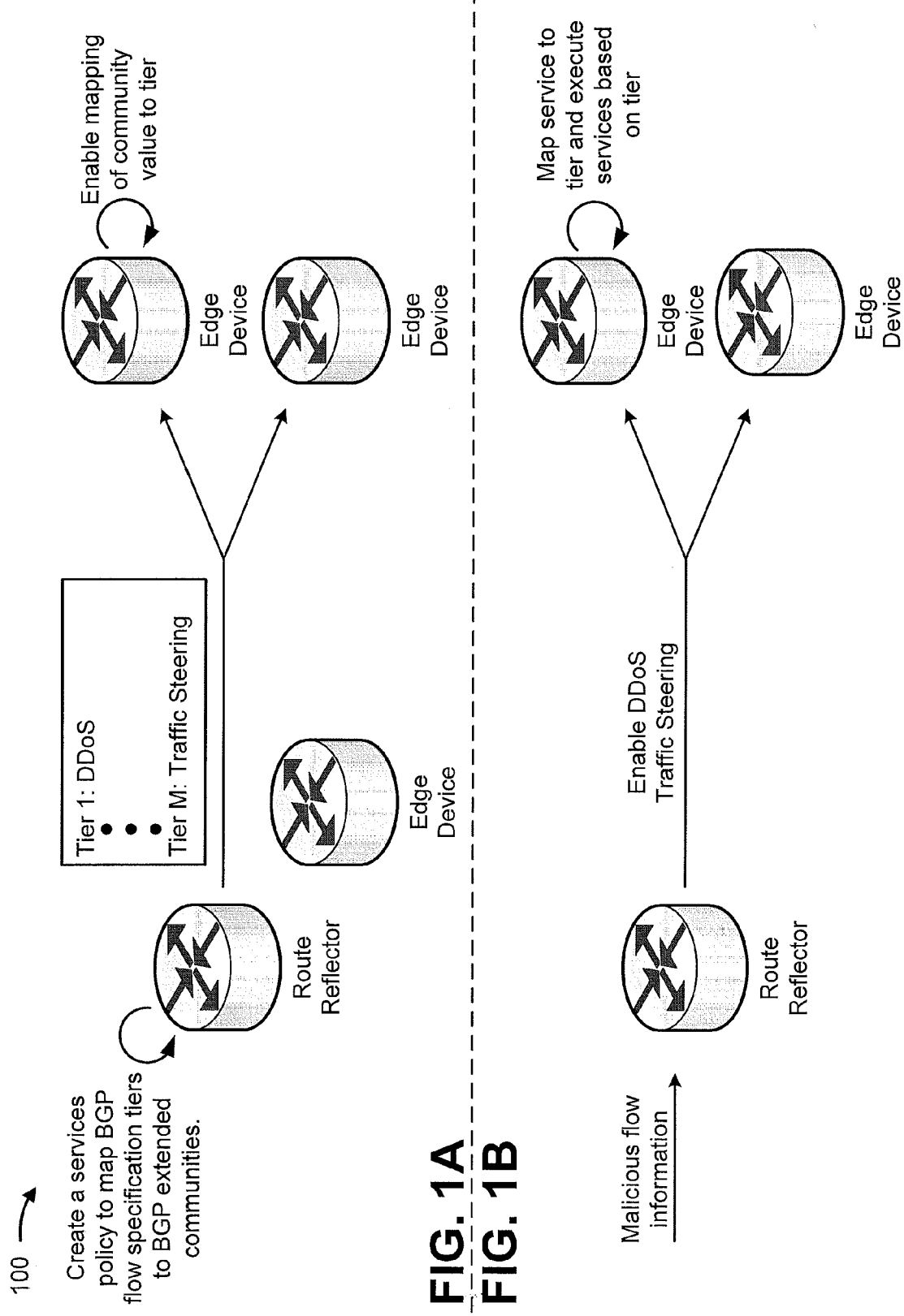
FIGS. 1A and 1B are diagrams of an overview of an example implementation described herein.

FIGS. 1A and 1B are diagrams of an overview of an example implementation 100 described herein. As shown in FIG. 1A, a particular network may include a route reflector and a set of edge devices (e.g., edge routers). The route reflector may be configured to enable prioritized BGP flow specification and may include access to a data structure storing a services policy. In some implementations, the route reflector may create the services policy. The services policy may store priority information, such as a set of comparative priorities (e.g., tiers) for a set of network traffic services, information identifying actions associated with the network traffic services (e.g., computing actions associated with executing the network traffic services, such as forwarding network traffic to a particular destination, filtering network traffic, marking network traffic, etc.), and information identifying the network traffic services (e.g., information identifying prefixes that may be utilized when propagating information regarding a malicious flow. The services policy may be utilized to map BGP flow specification tiers to BGP extended communities. For example, the services policy may indicate that an extended community value corresponds DDoS mitigation network traffic service with a comparatively high priority and a traffic steering network traffic service with a comparatively low priority, and may include information associated with identifying and executing the DDoS mitigation network traffic service and the traffic steering network traffic service. The route reflector may propagate information associated with the services policy to the set of edge devices. The edge device may receive the information associated with the services policy, and may store the information associated with the services policy to enable recognition of tiers and execution of the network traffic services based on the tiers.

As shown in FIG. 1B, the route reflector may receive information identifying network traffic as being associated with a malicious flow. A malicious flow may refer to network traffic suspected and/or determined to be associated with an attack, such as a DDoS attack. For example, a detection device (not shown) may determine that a particular quantity of packets are associated with a DDoS attack and may provide information to the route reflector identifying the quantity of packets. The route reflector may provide information to the set of edge devices indicating that the flow is a malicious flow. For example, the route reflector may tag the network traffic as a malicious flow via a BGP extended community attribute, and may indicate that a DDoS mitigation network traffic service and a traffic steering network traffic service are to be executed.

The set of edge devices may receive the information from the route reflector and may determine one or more network traffic services to execute. For example, a particular edge device may analyze the BGP extended community attribute to determine that DDoS mitigation and traffic steering are to be executed, and the particular edge device may map the BGP extended community attribute to a tier of service based on the services policy. The particular edge device may determine a prioritization for executing multiple network traffic services based on the tier of service and/or based on one or more other factors. For example, the particular edge device may prioritize performing DDoS mitigation over performing traffic steering based on DDoS mitigation being associated with a higher tier of service than traffic steering. In this case, the particular edge device may allocate computing resources to the DDoS mitigation network traffic service at a higher priority than the traffic steering network traffic service, which is identified as being associated with a lower priority. For example, the particular edge device may prioritize the DDoS mitigation network traffic service with respect to order of processing, rate of processing, or the like.

In this way, computing resources may be effectively allocated to a higher priority service (over a lower priority service) deployed via BGP, thereby improving network performance.

Figure 2:
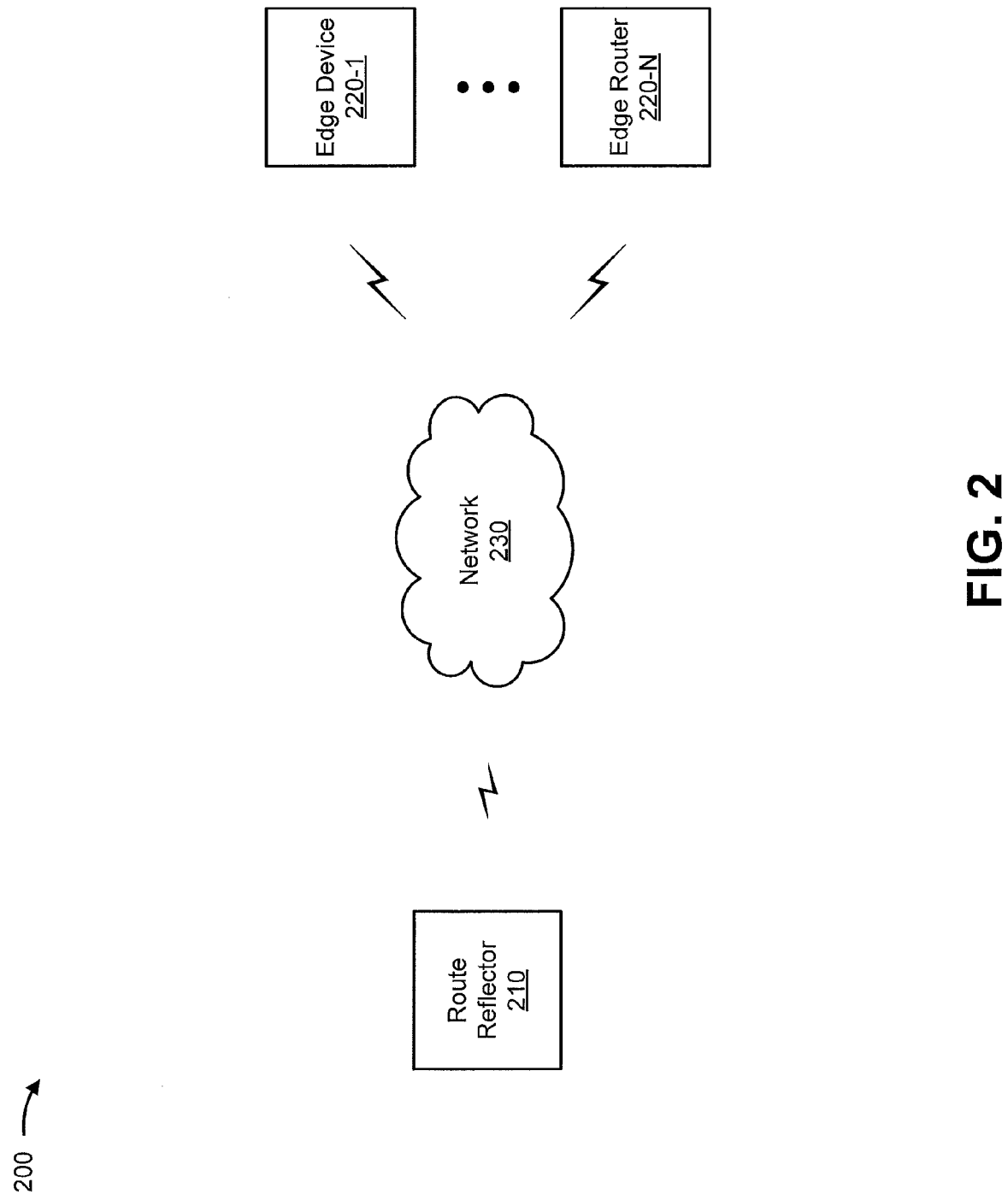
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a route reflector 210, one or more edge devices 220-1 through 220-N (N≥1) (hereinafter referred to collectively as "edge devices 220," and individually as "edge device 220"), and a network 230. Devices of environment 200 may interconnect via wired connections, wireless connections, or a combination of wired and wireless connections.

Route reflector 210 may include one or more traffic transfer devices capable of receiving and transmitting traffic via network 230. For example, route reflector 210 may receive network traffic from a source device and may selectively route the network traffic to a particular edge device 220. In some implementations, route reflector 210 may implement BGP and facilitate transfer of information associated with a flow specification. For example, route reflector 210 may facilitate deployment and propagation of a services policy, and route reflector 210 may facilitate deployment and propagation of information identifying a network performance service that is to be implemented by one or more edge devices 220.

Edge device 220 may include one or more traffic transfer devices capable of receiving and transmitting traffic via network 230. For example, edge device 220 may include a router, a gateway, a switch, a hub, a server, and/or another traffic transfer device. In some implementations, edge device 220 (e.g., a provider edge router) may receive network traffic via route reflector 210 and a first network 230 and may route the network traffic to a network destination that may be associated with a second network 230. In some implementations, edge device 220 may be capable of utilizing BGP to receive information regarding network performance services.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
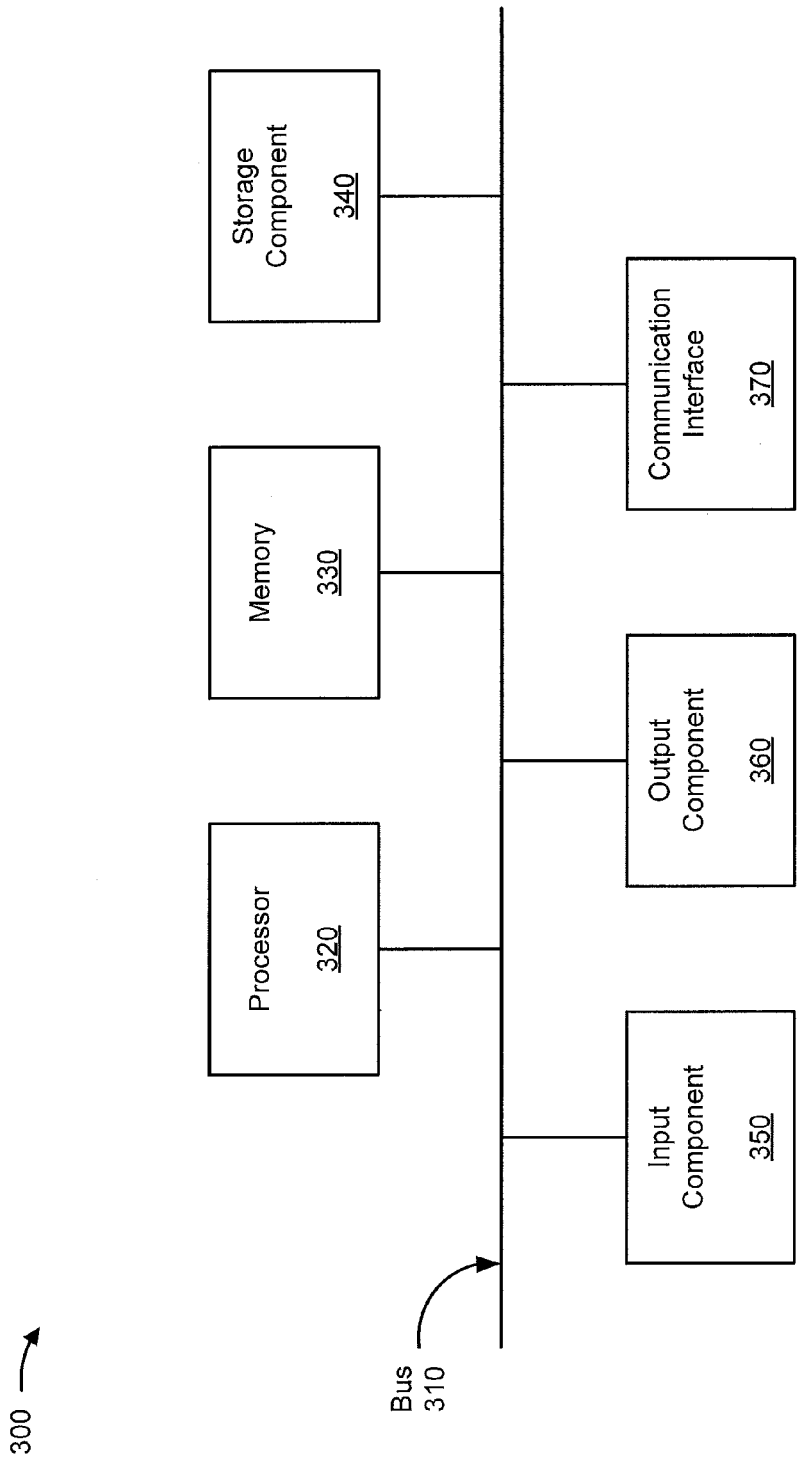
FIG. 3 is a diagram of example components of one or more devices of FIG. 2.

FIG. 3 is a diagram of example components of a device 300. Device 300 may correspond to route reflector 210 and/or provider edge device 220. In some implementations, route reflector 210 and/or provider edge device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
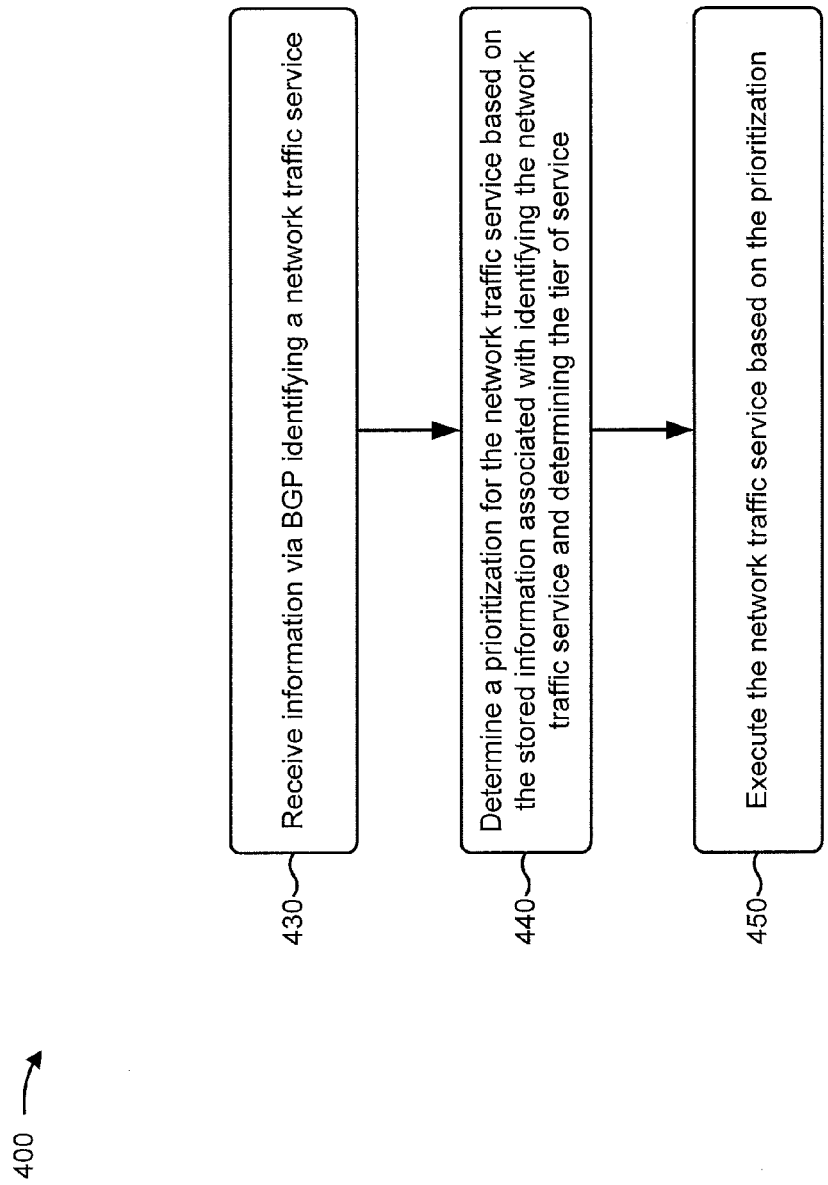

FIGS. 4A and 4B are flow charts of an example process 400 for utilizing tiered services with BGP. In some implementations, one or more process blocks of FIGS. 4A and 4B may be performed by edge device 220. In some implementations, one or more process blocks of FIGS. 4A and 4B may be performed by another device or a set of devices separate from or including edge device 220, such as route reflector 210.

As shown in FIG. 4A, process 400 may include receiving information identifying one or more tiers of service corresponding to one or more network traffic services (block 410). For example, edge device 220 may receive information, from route reflector 210, identifying the one or more tiers of service. In some implementations, route reflector 210 may enable tiered services for a set of edge devices 220. A network traffic service may refer to a network process, such as a DDoS mitigation network traffic service (e.g., a network traffic service associated with rerouting network traffic during a DDoS attack), a traffic steering network traffic service (e.g., a network traffic service associated with directing traffic from a peering router to a media flow controller), a remarking network traffic service (e.g., a network traffic service associated with remarking differentiated traffic toward an alternative routing plane), a traffic filtering network traffic service (e.g., a network traffic service associated assigning network traffic to a particular flow route), or the like. A network traffic service may be associated with a match criteria (e.g., information identifying the network traffic service), an action criteria (e.g., an action taken by edge device 220 when implementing the network traffic service), a tier (e.g., a comparative prioritization of the network traffic service), or the like.

In some implementations, route reflector 210 may receive information indicating that tiered services are to be enabled from a network control device (e.g., a device associated with control functions of network 230), and may provide the information to a set of edge devices 220 that includes edge device 220. Additionally, or alternatively, a user may provide an instruction that causes route reflector 210 to enable tiered services. In some implementations, route reflector 210 may receive a services policy associated with enabling tiered services from a data structure, from a network control device, or the like, and may provide the services policy to edge device 220. For example, route reflector 210 may receive the services policy that includes information associated with mapping an extended community attribute that identifies a network traffic service to a tier of service.

In some implementations, route reflector 210 may provide information identifying the set of tiers for the set of services to edge device 220. For example, route reflector 210 may provide information indicating that a first service is associated with a first tier and a second service is associated with a second tier. In some implementations, route reflector 210 may provide information associated with identifying the set of services to edge device 220. For example, route reflector 210 may provide information to edge device 220 that identifies a first extended community attribute that is associated with a first service and a second extended community attribute that is associated with a second service.

In some implementations, edge device 220 may receive the services policy and/or information associated therewith, and may enable tiered services. For example, edge device 220 may store information associated with mapping a received prefix (e.g., a BGP route announcement) to a service and an associated tier. In this way, tiered services for BGP may be enabled for network 230.

As further shown in FIG. 4A, process 400 may include storing information associated with identifying a network traffic service, of the one or more network traffic services, and determining a tier of service, of the one or more tiers of service, corresponding to the network traffic service (block 420). For example, edge device 220 may store the information identifying the one or more tiers of service for the one or more corresponding network traffic services. In some implementations, edge device 220 may store a services policy. For example, when route reflector 210 provides information associated with a services policy that identifies a network traffic service, an action associated with the network traffic service, and a tier, edge device 220 may store the services policy via a data structure. In some implementations, edge device 220 may enable a configuration associated with utilizing tiers of service when storing information associated with identifying a network traffic service and a corresponding tier. For example, edge device 220 may enable recognition of information included in a BGP message (e.g., an extended community attribute) that identifies the network traffic service, and edge device 220 may enable mapping of the information of the BGP message to the data structure storing the services policy.

In this way, edge device 220 may be configured to utilize tiered services in association with BGP.

As shown in FIG. 4B, process 400 may include receiving information via BGP identifying a network traffic service (block 430). For example, edge device 220 may receive the information via BGP that identifies the network traffic service. In some implementations, edge device 220 may receive the information from route reflector 210. For example, a detection device may determine that a particular quantity of network traffic is associated with a malicious flow (e.g., the network traffic is associated with a DDoS attack) and may provide information to route reflector 210 indicating that the particular quantity of network traffic is associated with a malicious flow. In this case, route reflector 210 may tag the network traffic as a malicious flow using a BGP extended community attribute, and may provide the BGP extended community attribute to edge device 220. In some implementations, edge device 220 may receive a flow specification (e.g., a message sent via BGP that encapsulates criteria for matching network traffic, such as to identify network traffic associated with a malicious flow), via BGP and from route reflector 210, that is associated with the extended community attribute. In some implementations, edge device 220 may receive information identifying multiple network traffic services to be executed on multiple flows (i.e., quantities of network traffic). For example, edge device 220 may receive information indicating that a DDoS mitigation network traffic service, a traffic steering network traffic service, a source network address translation network traffic service, a variable offset firewall filter network traffic service, a differentiated service remarking network traffic service, or the like are to be executed on flows being received by edge device 220.

In some implementations, edge device 220 may parse received information to identify a network traffic service. For example, when edge device 220 receives information via BGP, edge device 220 may parse the received information to identify one or more octets of data that encode an extended community attribute that corresponds to a network traffic service. In this case, edge device 220 may map the extended community attribute to a particular service, and subsequently a tier of service.

As further shown in FIG. 4B, process 400 may include determining a prioritization for the network traffic service based on the stored information associated with identifying the network traffic service and determining the tier of service (block 440). For example, edge device 220 may map an extended community attribute, received from route reflector 210, to a tier of service for a particular network traffic service. In some implementations, edge device 220 may compare the information received from route reflector 210 to a services policy. For example, edge device 220 may compare the network traffic service, an extended community attribute corresponding to the network traffic service, or the like to a stored services policy to determine a tier of service for the network traffic service.

In some implementations, edge device 220 may determine a prioritization for the network traffic service based on the tier of service. For example, edge device 220 may determine that the network traffic service is to be prioritized above another network traffic service based on the network traffic service being associated with a higher tier of service compared with the other network traffic service. Additionally, or alternatively, edge device 220 may prioritize execution of the set of services based on one or more other prioritization factors, such as response rate associated with a network traffic service, an order of processing associated with a network traffic service, a rate of processing associated with a network traffic service, a time factor (e.g., a prioritization adjustment based on the time of day), a network load factor (e.g., a prioritization based on network load), an order of network traffic service receipt, or the like. For example, edge device 220 may receive information identifying a network traffic condition (e.g., a quantity of network traffic, a rate of network throughput, or the like), and may prioritize execution of the set of services based on the network traffic condition.

As further shown in FIG. 4B, process 400 may include executing the network traffic service based on the prioritization (block 450). For example, edge device 220 may execute the network traffic service based on the prioritization. In some implementations, edge device 220 may execute a set of services, which include the network traffic service, in a particular order based on the prioritization. For example, when a DDoS mitigation network traffic service is prioritized higher than a traffic steering network traffic service, edge device 220 may perform DDoS mitigation and subsequently perform traffic steering. Additionally, or alternatively, edge device 220 may allocate a particular quantity of computing resources for executing the network traffic service based on the prioritization. For example, when a DDoS mitigation network traffic service is prioritized higher than a traffic steering network traffic service, edge device 220 may allocate a larger quantity of computing resources (e.g., processing resources, bandwidth resources, or the like) to DDoS mitigation as compared with traffic steering. In some implementations, edge device 220 may utilize a first response rate for a first service associated with a first tier and a second response rate for a second service associated with a second tier based on the prioritization. Additionally, or alternatively, edge device 220 may provide a comparatively higher queue priority for a service with a comparatively higher tier based on the prioritization. In some implementations, edge device 220 may apply a flow specification associated with the network traffic service to the network traffic.

In some implementations, edge device 220 may update the prioritization based on receiving additional information via BGP (e.g., from route reflector 220). For example, edge device 220 may receive information identifying another service via BGP, may determine a tier for the other service, another prioritization for the set of services and the other service, and may execute the set of services and the other service in a particular order based on the new prioritization.

In some implementations, edge device 220 may alter a prioritization of a set of tiers. For example, edge device 220 may determine that, for a first network traffic service associated with a first tier and a second network traffic service associated with a second, comparatively lower tier, the second tier is to be prioritized above the first tier, and may alter the first tier and the second tier to prioritize the second tier above the first tier.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
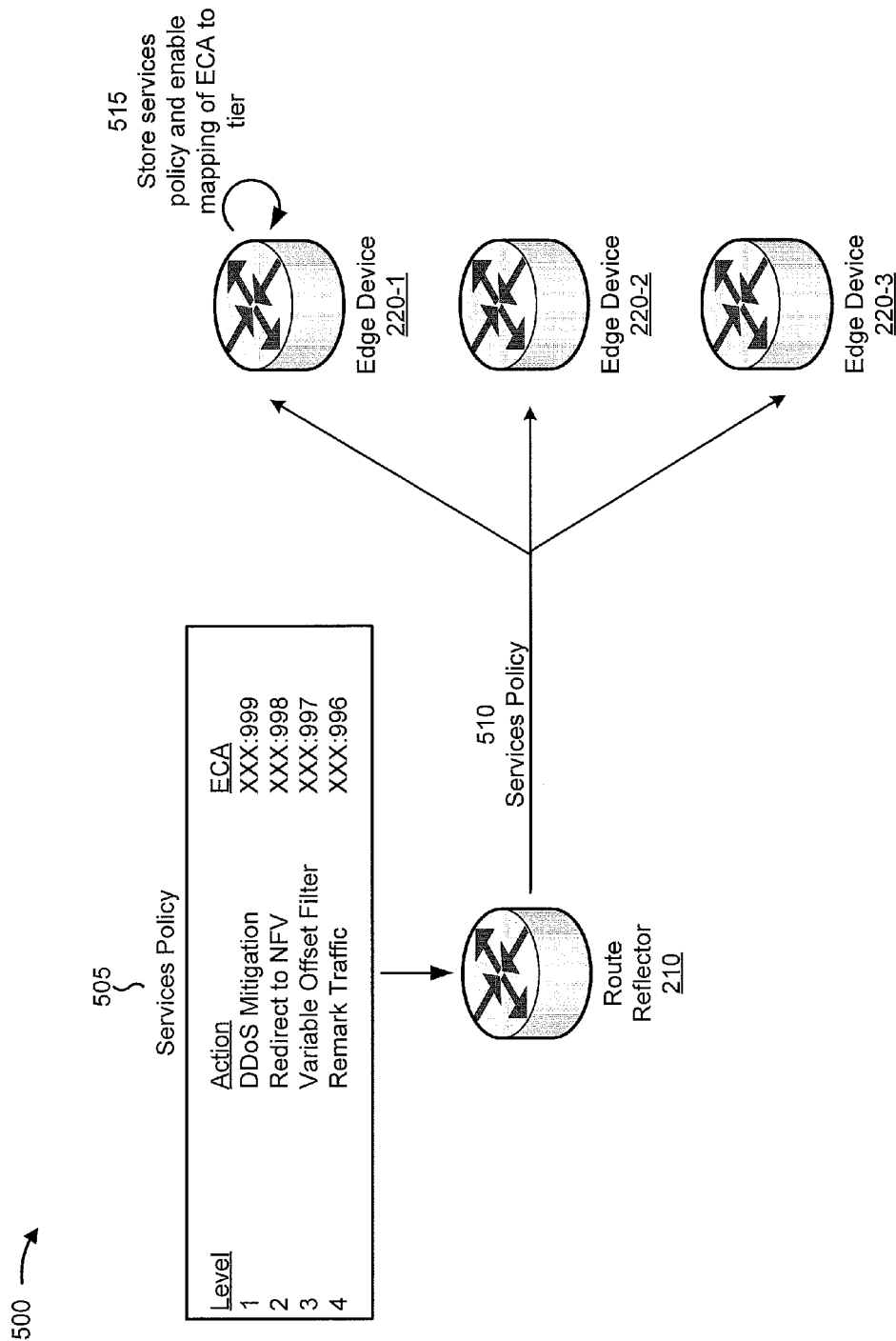
FIGS. 5A-5C are diagrams of an example implementation relating to the example process shown in FIGS. 4A and 4B.
Figure 5B:
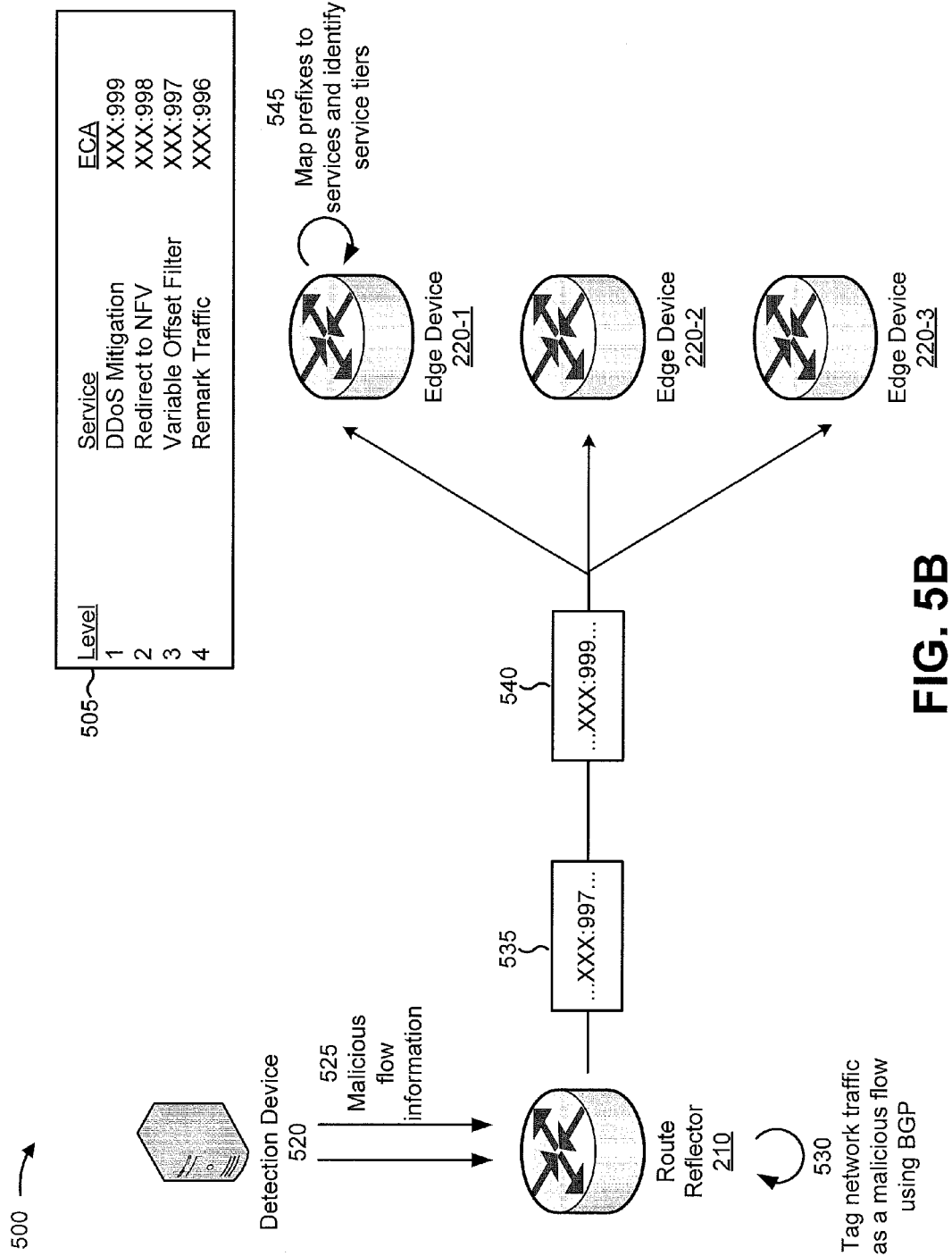
Figure 5C:
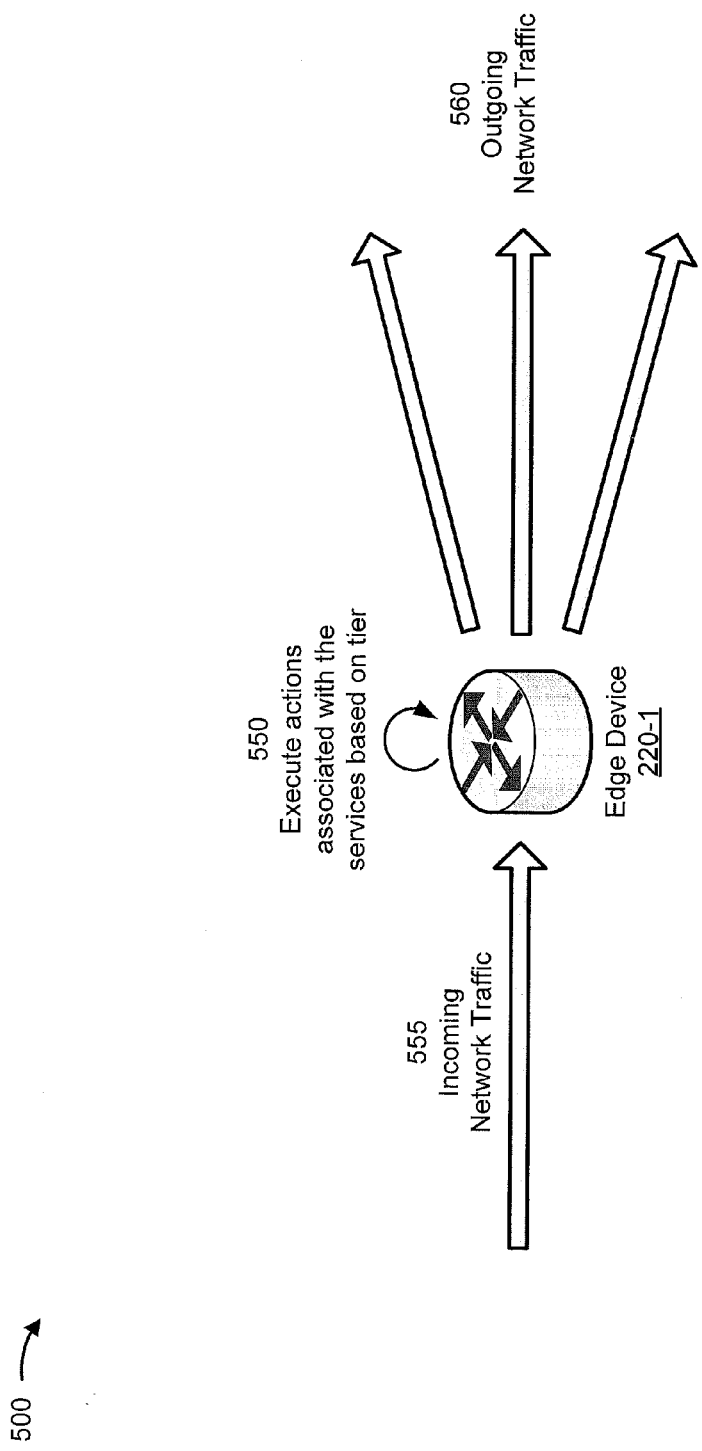

FIGS. 5A-5C are diagrams of an example implementation 500 relating to example process 400 shown in FIGS. 4A and 4B. FIGS. 5A-5C show an example of utilizing tiered services with BGP.

As shown in FIG. 5A, and by reference number 505, route reflector 210 may receive, from a storage device, a services policy that includes information associated with facilitating tiered services in BGP. The services policy includes information, such as tier information (e.g., "Level"), network traffic service action information (e.g., "Action"), and information associated with identifying the network traffic service (e.g., "ECA" referring to an extended community attribute). As shown by reference number 510, a set of edge devices 220-1, 220-2, and 220-3, receive the services policy from route reflector 210. As shown by reference number 515, the set of edge devices 220 (e.g., edge device 220-1) store the services policy and enable mapping of extended community attributes to tiers of service associated with network traffic services. In this way, edge device 220 may be configured to facilitate tiered services for BGP.

As shown in FIG. 5B, detection device 520 may determine that a particular quantity of network traffic is associated with a malicious flow and may provide information identifying the malicious flow to route reflector 210, as shown by reference number 525. As shown by reference number 530, route reflector 210 tags the network traffic as a malicious flow using BGP and provides a set of extended community attributes to the set of edge devices 220 in association with providing the network traffic. As shown by reference number 535, the set of edge devices 220 receive the information from route reflector 210 via BGP (e.g., an extended community attribute, "XXX:997" corresponding to a variable offset filter network traffic service). As shown by reference number 540, the set of edge devices 220 receive other information from route reflector 210 via BGP (e.g., another extended community attribute, "XXX:999" corresponding to a DDoS mitigation network traffic service). As shown by reference number 545, the set of edge devices 220 (e.g., edge device 220-1) map the received extended community attributes to the corresponding network traffic services and identify tiers associated with the corresponding services based on the services policy. Assume that edge device 220-1 determines a prioritization based on the tiers of service for the network traffic services that prioritizes providing network resources for performing DDoS mitigation above providing network resources for providing variable offset filtering.

As shown in FIG. 5C, and by reference number 550, edge device 220-1 executes the actions associated with the network traffic services utilizing the prioritization. As shown by reference number 555, edge device 220-1 may receive incoming network traffic onto which the network traffic services are to be performed, and may performs DDoS mitigation based on prioritizing DDoS mitigation above variable offset filtering. As shown by reference number 560, based on executing the actions associated with performing the network traffic services on the incoming network traffic, edge device 220-1 routes outgoing network traffic toward one or more network destinations.

As indicated above, FIGS. 5A-5C are provided merely as an example. Other examples are possible and may differ from what was described with regard to FIGS. 5A-5C.

In this way, multiple services executed by an edge device may be prioritized using information provided via BGP, thereby improving network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory to store instructions; and
one or more processors to execute the instructions to:
receive information, via one or more border gateway protocol messages, identifying a first network traffic service and a second network traffic service,
the first network traffic service being associated with a first action performed by the device on incoming network traffic, and
the second network traffic service being associated with a second action performed by the device on the incoming network traffic;
map the information identifying the first network traffic service and the second network traffic service to information identifying a first tier of service for the first network traffic service and a second tier of service for the second network traffic service,
the first tier of service and the second tier of service indicating a priority ordering of a set of network traffic services, and
the set of network traffic services including the first network traffic service and the second network traffic service; and
perform the first action and the second action, on the incoming network traffic, based on an order of the first tier of service, for the first network traffic service, and the second tier of service, for the second network traffic service, in the priority ordering of the set of network traffic services,
the first action being performed at a first response rate associated with the first tier of service, and
the second action being performed at a second response rate associated with the second tier of service.

2. The device of claim 1, where the one or more processors are further to:
identify an extended community attribute based on the one or more border gateway protocol messages,
the extended community attribute identifying the first network traffic service; and
where the one or more processors, when mapping the information, are further to:
map the extended community attribute to the first tier of service.

3. The device of claim 1, where the one or more processors, are further to:
determine that the first tier of service is comparatively higher than the second tier of service in the priority ordering of the set of network traffic services; and
where the one or more processors, when performing the first action and the second action, are further to:
perform the first action before performing the second action based on determining that the first tier of service is comparatively higher than the second tier of service in the priority ordering of the set of network traffic services.

4. The device of claim 1, where the one or more processors are further to:
assign a first quantity of computing resources to performing the first action,
the first quantity of computing resources being based on the first tier of service; and
assign a second quantity of computing resources to performing the second action,
the second quantity of computing resources being based on the second tier of service.

5. The device of claim 1, where the one or more processors are further to:
receive information associated with interpreting border gateway protocol messages to determine a corresponding tier of service for a network traffic service of the set of network traffic services; and
where the one or more processors, when mapping the information, are further to:
map the information using the information associated with interpreting border gateway protocol messages.

6. The device of claim 1, where the one or more processors are further to:
determine to perform the first action before the second action based on the first tier of service and the second tier of service; and
where the one or more processors, when performing the first action and the second action, are further to:
perform the first action before the second action.

7. The device of claim 1, where the one or more processors are further to:
determine a prioritization of the first network traffic service and the second network traffic service based on the first tier of service and the second tier of service;
alter the prioritization based on one or more other prioritization factors to generate an altered prioritization;
assign computing resources to perform the first action based on the altered prioritization; and
where the one or more processors, when performing the first action, are further to:
perform the first action using the computing resources.

8. A method, comprising:
receiving, by a first device, network traffic from a second device,
the network traffic being tagged with a border gateway protocol message;
identifying, by the first device, a network traffic service to be performed on the network traffic based on the border gateway protocol message,
the network traffic service being associated with an action;
determining, by the first device, a tier of service associated with the network traffic service based on a stored services policy; and
executing, by the first device, the action on the network traffic based on the tier of service and at a particular rate of response associated with the tier of service,
the action being associated with the network traffic service.

9. The method of claim 8, further comprising:
identifying a border gateway protocol extended community attribute associated with the network traffic; and
where determining the tier of service further comprises:
determining the tier of service based on the border gateway protocol extended community attribute.

10. The method of claim 8, where executing the action further comprises:
prioritizing execution of the action, on the network traffic, over execution of one or more other actions, on the network traffic, based on the tier of service,
the one or more other actions being associated with one or more other network traffic services.

11. The method of claim 8,
where receiving the network traffic comprises:
receiving, via the border gateway protocol message, a flow specification, the flow specification including information associated with identifying the network traffic service; and where executing the action comprises:
applying the flow specification information to the network traffic.

12. The method of claim 8, further comprising:
receiving another border gateway protocol message identifying another network traffic service,
the other network traffic service being associated with another tier of service; and
where executing the action associated with the network traffic service comprises:
executing the action based on the tier of service and the other tier of service.

13. The method of claim 12, where the other network traffic service is associated with another action, and
where the method further comprises:
performing the action before the other action based on the tier of service and the other tier of service.

14. A non-transitory computer-readable medium storing instructions, the instructions comprising:
one or more instructions that, when executed by one or more processors of a device, cause the one or more processors to:
receive one or more border gateway protocol extended community attributes;
identify a first network traffic service and a second network traffic service based on the one or more border gateway protocol extended community attributes,
the first network traffic service being associated with a first action performed by the device on incoming network traffic, and
the second network traffic service being associated with a second action performed by the device on the incoming network traffic;
map the one or more border gateway protocol extended community attributes to a first tier of service associated with the first network traffic service and a second tier of service associated with the second network traffic service,
the first tier of service and the second tier of service being associated with a priority ordering of network traffic services; and
selectively perform the first action and the second action, on the incoming network traffic, based on a priority order of the first tier of service, for the first network traffic service, and the second tier of service, for the second network traffic service, in the priority ordering of the network traffic services,
the first action being performed at a first response rate associated with the first tier of service, and
the second action being performed at a second response rate associated with the second tier of service.

15. The non-transitory computer-readable medium of claim 14, where the one or more instructions, when executed by the one or more processors, further cause the one or more processors to:
receive the incoming network traffic associated with the one or more border gateway protocol extended community attributes;
determine that the first action is associated with a comparatively higher priority compared to the second action based on the first tier of service and the second tier of service; and
where the one or more instructions, that cause the one or more processors to selectively perform the first action and the second action, cause the one or more processors to:
perform the first action on the incoming network traffic based on determining that the first action is associated with the comparatively higher priority than the second action.

16. The non-transitory computer-readable medium of claim 14, where the one or more instructions, when executed by the one or more processors, further cause the one or more processors to:
determine that the first action is associated with a comparatively higher priority than the second action based on the first tier of service and the second tier of service; and
where the one or more instructions, that cause the one or more processors to selectively perform the first action and the second action, cause the one or more processors to:
perform the first action before the second action based on determining that the first tier of service is associated with the comparatively higher priority than the second tier of service.

17. The non-transitory computer-readable medium of claim 14, where the one or more instructions, when executed by the one or more processors, further cause the one or more processors to:
assign a first quantity of computing resources to performing the first action,
the first quantity of computing resources being based on the first tier of service;
assign a second quantity of computing resources to performing the second action,
the second quantity of computing resources being based on the second tier of service; and
where the one or more instructions, that cause the one or more processors to selectively perform the first action and the second action, further cause the one or more processors to:
perform the first action utilizing the first quantity of computing resources; and
perform the second action utilizing the second quantity of computing resources.

18. The non-transitory computer-readable medium of claim 14, where the one or more instructions, when executed by the one or more processors, further cause the one or more processors to:
receive services policy information associated with interpreting the one or more border gateway protocol extended community attributes to determine a corresponding tier of service for a network traffic service; and
where the one or more instructions, that cause the one or more processors to map the one or more border gateway protocol extended community attributes, further cause the one or more processors to:
map the one or more border gateway protocol extended community attributes based on the services policy information.

19. The non-transitory computer-readable medium of claim 14, where the one or more instructions, when executed by the one or more processors, further cause the one or more processors to:
receive information identifying a network traffic condition;

determine a prioritization for performing the first action and the second action based on the first tier of service, the second tier of service, and the network traffic condition; and where the one or more instructions, that cause the one or more processors to selectively perform the first action and the second action, cause the one or more processors to:

perform the first action and the second action based on the prioritization.

20. The non-transitory computer-readable medium of claim 14, where the one or more instructions, when executed by the one or more processors, further cause the one or more processors to:

determine an order of receipt of first information associated with causing the first action to be performed and second information associated with causing the second action to be performed, the first information and the second information being associated with the one or more border gateway protocol extended community attributes;

determine a prioritization for performing the first action and the second action based on the first tier of service, the second tier of service, and the order of receipt; and where the one or more instructions, that cause the one or more processors to selectively perform the first action and the second action, cause the one or more processors to:

perform the first action and the second action based on the prioritization.

* * * * *